US007735680B2

(12) United States Patent
Godlewski

(10) Patent No.: US 7,735,680 B2
(45) Date of Patent: Jun. 15, 2010

(54) CONTROLLED DISPENSING SYSTEM WITH MODULAR CAROUSEL

(75) Inventor: Peter Godlewski, San Clemente, CA (US)

(73) Assignee: Nexiant, Lake Forest, CA (US)

(*) Notice: Subject to any disclaimer, the term of this patent is extended or adjusted under 35 U.S.C. 154(b) by 0 days.

(21) Appl. No.: 12/141,734

(22) Filed: Jun. 18, 2008

(65) Prior Publication Data

US 2008/0257901 A1 Oct. 23, 2008

Related U.S. Application Data

(62) Division of application No. 10/950,022, filed on Sep. 24, 2004, now Pat. No. 7,395,945.

(51) Int. Cl.
*B65G 59/00* (2006.01)
*B65G 1/00* (2006.01)
*G07F 11/00* (2006.01)

(52) U.S. Cl. ....................... 221/122; 221/121; 221/120; 221/92; 221/78; 221/185; 221/76; 221/69; 221/242; 221/133; 364/403

(58) Field of Classification Search .................. 221/92, 221/78, 185, 76, 69, 120, 242, 133; 121/121, 121/122; 364/403
See application file for complete search history.

(56) References Cited

U.S. PATENT DOCUMENTS 2,187,232 A * 1/1940 Garner et al. ................. 74/128
2,697,536 A * 12/1954 Cicero ........................ 220/211
3,122,401 A * 2/1964 Johnson ..................... 312/97.1
3,940,016 A * 2/1976 Krakauer .................... 221/129
4,317,604 A * 3/1982 Krakauer ................... 312/97.1
4,498,603 A 2/1985 Wittenborg
4,942,954 A * 7/1990 Nesser et al. ............... 194/351
5,014,875 A * 5/1991 McLaughlin et al. ........... 221/2
5,313,393 A * 5/1994 Varley et al. .................. 705/28
5,730,316 A * 3/1998 Falk ........................... 221/122
6,467,603 B2 * 10/2002 Castleberry ................. 194/227
6,594,549 B2 * 7/2003 Siegel ........................ 700/241
7,395,945 B2 * 7/2008 Godlewski .................. 221/122
2004/0200853 A1 * 10/2004 Prichard et al. ............... 221/69
2004/0245278 A1 * 12/2004 Steffens et al. .............. 221/265

FOREIGN PATENT DOCUMENTS

EP 1 382 273 A1 1/2004

* cited by examiner

*Primary Examiner*—Gene O. Crawford
*Assistant Examiner*—Rakesh Kumar
(74) *Attorney, Agent, or Firm*—Knobbe, Martens, Olson & Bear, LLP

(57) ABSTRACT

A dispensing device and method including a housing defining an opening. A door is movable relative to the housing from a closed position to a maximum open position. The door and the housing defining an access portion of the opening. A tray is disposed within the housing and is supported for movement relative to the housing. The tray is configured to support dispensable items within a plurality of segments of the tray. An access control mechanism is configured to locate the tray relative to the housing to generally align a selected one of the plurality of segments with the opening and also to limit opening movement of the door to limit a size of the access portion to a size of the selected segment if a corresponding position of the door is less than the maximum open position of the door.

18 Claims, 13 Drawing Sheets

CONTROLLED DISPENSING SYSTEM WITH MODULAR CAROUSEL

RELATED APPLICATION

This application is a divisional of U.S. patent application Ser. No. 10/950,022, filed Sep. 24, 2004, pending, the entirety of which is incorporated by reference herein and made a part of the present specification.

BACKGROUND OF THE INVENTION

1. Field of the Invention

The present invention relates to dispensing systems and, more specifically, relates to a controlled dispensing system including a modular carousel assembly.

2. Description of the Related Art

Dispensing systems are used to provide dispensable items to authorized users, often at or near the point of use. Certain systems may be substantially automated, capable of tracking the type and quantity of items dispensed and capable of automatically reordering supplies when the dispensable items within the system reach a designated reorder inventory level. Such systems have the potential to significantly reduce costs normally incurred in the dispensing and inventory tracking of dispensable items in various industries. In addition, such systems potentially decrease the risk of incorrect items being dispensed, such as in the dispensing of medicine, for example.

A disadvantage of prior dispensing systems involves a lack of flexibility in initially configuring the dispensing system to suit the needs of a particular user, such as the size and quantity of items to be dispensed. Furthermore, prior dispensing systems often do not permit reconfiguration of the dispensing system to adapt to the changing needs of the user as those needs evolve over time. Even if possible, the cost involved often precludes such reconfiguration.

If the dispensing system is not capable of reconfiguration to satisfy the changing needs of the user, the dispensing system may become underutilized and, as a result, may fail to provide the expected benefit. Accordingly, a need exists for a dispensing system that may be configured to suit a variety of end users in a cost-efficient manner and, preferably, be capable of reconfiguration as the end user's needs change over time.

SUMMARY OF THE INVENTION

Presently preferred embodiments of the dispensing system include one or more dispensing units, each including one or more carousel assemblies. Preferably, each carousel assembly includes a carousel configured to accommodate a plurality of supply items. A plurality of removable dividers divide the carousel into a plurality of individual segments. In a presently preferred arrangement, the dispensing unit positions a desired one of the plurality of segments into a dispensing position and permits a door to be opened to expose the desired segment. Preferably, the dispensing unit limits the distance the door may open so that only the desired segment is exposed. In a presently preferred arrangement, the distance the door may open is at least partially limited by the dividers of the carousel. In addition, with such a preferred construction, the removable dividers permit reconfiguration of the carousel to accommodate different volumes or sizes of supply items. Accordingly, the presently preferred arrangement of the dispensing system is capable of adapting to the changing needs or preferences of the user.

A preferred embodiment involves a dispensing unit for a controlled dispensing machine comprising a housing defining an interior space and an opening to the interior space. A door is slidably supported relative to the housing and is movable from a closed position, blocking the opening, to an opened position, not blocking the opening. A carousel is supported within the interior space for rotation relative to the housing. The carousel includes a plurality of dividers, which divide the carousel into a plurality of segments. Each of the plurality of segments is configured to receive a dispensable item. In addition, each of the dividers includes an associated tab. A first stop is coupled to the housing and is configured to selectively interfere with a first tab associated with a first divider of the plurality of dividers to prevent rotation of the carousel in a first direction. A second stop is carried by the door and is configured to interfere with a second tab associated with a second divider of the plurality of dividers, adjacent the first divider. A specific segment defined between the first divider and the second divider is generally aligned with the opening when the first stop interferes with the first tab, and the second stop prevents the door from opening beyond the second divider in the first direction.

Another preferred embodiment involves a dispensing device comprising a housing defining an interior space and an opening to the interior space. A door is movable in a first direction relative to the housing from a closed position to an open position. The door and the housing cooperate to define an access portion of the opening, which permits access to the interior space. A tray is disposed at least partially within the interior space and is supported for movement relative to the housing. The tray is configured to support dispensable items within a plurality of segments of the tray, each of the segments having a first dimension in the first direction. A first stop is configured to locate the tray relative to the housing to generally align a selected one of the plurality of segments with the opening. A second stop is configured to limit movement of the door in the first direction to limit a size of the access portion to approximately the first dimension if a corresponding position of the door is less than the maximum open position of the door.

Yet another preferred embodiment involves a method of controlled dispensing of items, including providing a tray containing a plurality of items within a housing, the housing including an opening permitting access to one or more of the items. The method further includes providing a door closing the opening and moving the tray until a segment of the tray containing a desired one of the plurality of items is generally aligned with the opening. The method also includes permitting the door to move in an opening direction and limiting movement of the door to a selected distance in a first direction approximately equal to a dimension of the segment in the first direction if the selected distance is less than a maximum opening distance of the door.

Still another preferred embodiment involves a method of replenishing a dispensing system including communicating to a supply station a need for replenishment of an existing carousel of a dispensing unit. The method further includes preparing a replacement carousel having a plurality of segments. The method also includes communicating from the remote supply station to the dispensing unit an expected segment pattern of said replacement carousel and replacing the existing carousel with the replacement carousel. The method further includes rotating the replacement carousel through at least one full revolution and sensing each of a plurality of dividers to determine a segment pattern of the replacement carousel. The method further includes comparing the segment pattern of the replacement carousel to the expected segment pattern and accepting the replacement carousel if the segment pattern of the replacement carousel matches the expected segment pattern.

Another preferred embodiment involves a method of reconfiguring a dispensing system including providing a dispensing machine, having a first carousel, with an expected segment pattern of a second carousel. The method further includes determining when the first carousel has been replaced with the second carousel and determining a zero position of the second carousel with respect to a housing of the dispensing machine. The method also includes rotating the second carousel through a complete revolution and sensing a location of each of a plurality of dividers of the second carousel relative to the zero position. The method further includes determining a pattern of a plurality of segments of the second carousel defined by the plurality of dividers and comparing the pattern of the segments of the second carousel with an expected pattern.

BRIEF DESCRIPTION OF THE DRAWINGS

These and other features, aspects and advantages of the present invention are described with reference to drawings of a preferred embodiment, which is intended to illustrate, but not to limit, the present invention. The drawings contain thirteen figures.

DETAILED DESCRIPTION OF THE PREFERRED EMBODIMENTS

Figure 1:
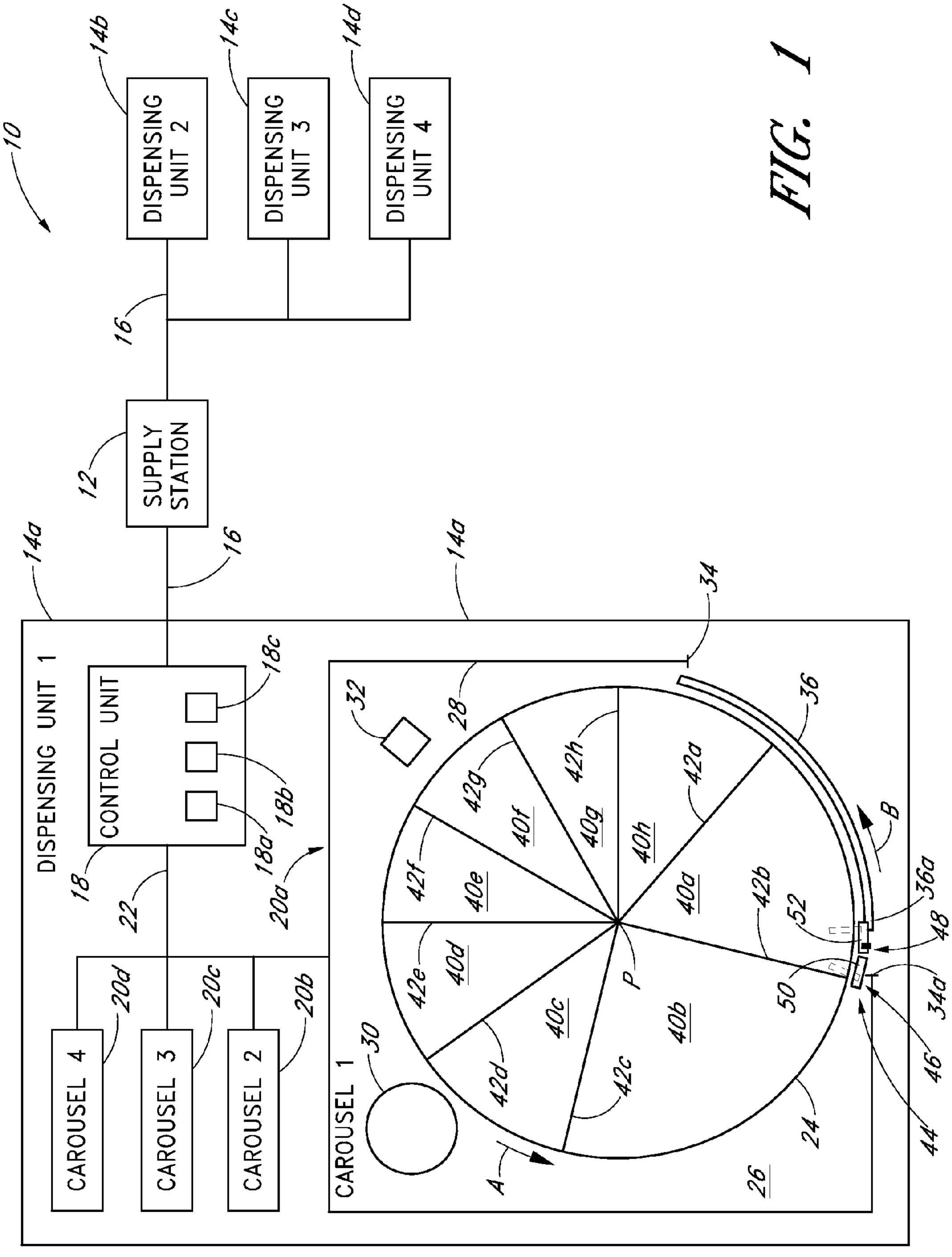
FIG. 1 is a schematic representation of a preferred embodiment of a dispensing system incorporating certain features, aspects and advantages of the present invention. The system of FIG. 1 includes a supply station in communication with a plurality of dispensing units.

With reference to FIG. 1, a preferred embodiment of the present controlled dispensing system 10 is illustrated. Preferably, the system 10 is capable of dispensing supply items to a user. More preferably, the system 10 is configured for controlled dispensing of supply items to authorized users in accordance with predetermined user access rights. In addition, the system 10 preferably stores data regarding the type and quantity of items dispensed such that the system 10 is able to track inventory levels. Furthermore, desirably, the system 10 is capable of generating a reorder request when inventories fall below a predetermined par level. Such a system 10 is advantageous in providing controlled dispensing of items in a variety of different applications, such as industrial or medical environments, for example.

The illustrated dispensing system 10 includes a supply station 12 in communication with a plurality of dispensing units, generally referred to by the reference numeral 14. In the illustrated embodiment, four dispensing units are shown and numbered 14*a*-14*d*. The supply station 12 communicates with the dispensing units 14 over a suitable connection 16, which preferably is a hard-wired electronic connection or a wireless electronic connection. Other suitable methods of communication between the components of the dispensing system 10 or between the components of the dispensing units 14 may also be used. The supply station 12 may be of any suitable arrangement and, preferably, is configured to communicate with each of the dispensing units 14*a*-14*d* in order to obtain data regarding the inventory levels of each unit 14*a*-14*d*. However, the supply station 12 is not necessary configured for communication with all of the dispensing units 14*a*-14*d* simultaneously. That is, the supply station 12 may be connected to or in communication with a portion, or only one, of the dispensing units 14*a*-14*d* at any time. In one arrangement, the supply station 12 may comprise a stationary computer server disposed in a location remote from the dispensing units 14*a*-14*d*. In other arrangements, the supply station 12 may be portable. Alternatively, the dispensing units 14*a*-14*d* may be configured as stand-alone dispensing stations, and the supply station 12 may be omitted or integrated therein.

Preferably, each of the dispensing units 14*a*-14*d* are generally similar to one another and, therefore, only one unit 14*a* is illustrated in greater detail. Preferably, the dispensing unit 14*a* (hereinafter referred to by the reference numeral 14) includes a control unit 18 connected to one or more carousel assemblies, generally referred to by the reference numeral 20, over a suitable connection 22. The control unit 18 may comprise a single control unit assembly or may comprise multiple controllers functioning collectively to perform the desired tasks of the dispensing unit 14, preferably substantially as described herein. In addition, other suitable control mechanisms or assemblies may also be used.

The illustrated control unit 18 includes a processor 18*a*, a memory 18*b*, and a user interface 18*c*. The processor 18*a* may be any suitable standard or customized processor. The processor 18*a* preferably is configured to process data and control signals generated by various components of the system 10. The memory 18*b* may comprise any suitable type of memory device and may be configured to store system data and/or programs. The user interface 18*c* may be of any suitable construction and preferably permits a user to input information into the system 10 and preferably permits the system 10 to output information to the user. For example, the user interface 18*c* may include a display screen, a keyboard or other input device, and a scanner (e.g., barcode reader), along with other input or output devices, as desired.

The illustrated dispensing unit includes four carousel assemblies 20*a*-20*d*. Desirably, each of the carousel assemblies 20 is generally similar and, therefore, only one carousel assembly 20A is shown in greater detail. Preferably, each of the carousel assemblies 20 is separate from one another and may be separately removed from the dispensing unit 14. Advantageously, in the event that one carousel assembly 20 becomes inoperable, the others may remain in operation. In addition, the inoperable carousel assembly 20 may be quickly removed and replaced with a new carousel assembly 20, without resulting in excessive downtime of the dispensing unit 14.

The carousel assembly 20A (hereinafter referred to by the reference numeral 20) includes a movable tray, or carousel 24, at least partially supported within an interior space 26 of a housing 28. In the illustrated embodiment, the carousel 24 is rotatable relative to the housing 28 by a motor 30. However, in other arrangements, the tray or carousel 24 may be configured for movement other than rotation relative to the housing 28, such as linear translation, for example.

A position sensor 32 senses information regarding the position of the carousel 24 relative to the housing 28 so that the control unit 18 can control movement and positioning of the carousel 24 relative to the housing 28. The position sensor 32 may comprise any suitable position sensing arrangement. In the illustrated embodiment, however, an angular encoder is preferred, which may be based on the sensing of an angular position of the carousel 24 about a generally vertical axis containing the point P, as illustrated in FIG. 1. Additionally, the position sensor 32 may comprise a number of individual sensors, which cooperate to provide information regarding the carousel 24 to the system 10.

The housing 28 includes an opening 34, which is selectively closable by a door 36 to substantially inhibit and preferably prevent access to the carousel 24. The door 36 is movable from the illustrated closed position to a fully open position, which preferably exposes the entire opening 34 such that access to exposed portions of the carousel 24 is permitted. Preferably, the door 36 is movable in the direction indicated by the arrow B in FIG. 1 and moves in an arcuate manner about a generally vertical axis (as configured herein) containing the center point P of the carousel 24. In other arrangements, however, the door 36 may be configured for other types of movement, such as linear movement or rotation about a different axis, for example.

Preferably, the carousel 24 is divided into two or more segments, generally referred to by the reference numeral 40, which are each configured to hold one or more dispensable items. In the illustrated arrangement, the carousel 24 includes eight segments 40*a*-40*h*. As illustrated in FIG. 1, the segments 40*a*-40*h* may be provided in a variety of sizes. Alternatively, the segments 40*a*-40*h* may be of the same or a substantially similar size.

Preferably, the segments 40*a*-40*h* are defined between a plurality of dividers, generally referred to by the reference numeral 42. In the illustrated arrangement, eight dividers 42*a*-42*h* are provided, which define the eight segments 40*a*-40*h*. The dividers 42*a*-42*h* extend in a radial direction from the center point P of the carousel 24. However, the dividers 42*a*-42*h* may be provided in an alternative arrangement to create segments having shapes different than those illustrated in FIG. 1.

The illustrated carousel assembly 20 includes an access control mechanism 44, which preferably is configured to limit a size of the access opening defined between the housing 28 and the door 36. In a preferred arrangement, the access control mechanism limits the size of the access opening to correspond to the size of a single segment 40*a*-40*h* that is aligned with the opening 34 and door 36.

As illustrated in FIG. 1, the carousel 24 is positioned such that the segment 40*a* is generally aligned with the door 36 in its closed position. Specifically, the divider 42*b* is generally aligned with a first end 34*a* of the opening 34. The access control mechanism 44 permits the door 36 to be opened in the direction of the arrow B until a first end 36*a* of the door 36 is generally aligned with the divider 42*a*. As a result, an angular distance between the first end 34*a* of the opening 34 and a first end 36*a* of the door 36 is substantially the same as the angular distance of the radially outward-most portion of the segment 40*a*. That is, preferably, substantially the entire segment 40*a* is exposed to permit user access, while the housing 28 and door 36 cooperate to prevent access to any other segment 40*b*-40*h*. In the event that a segment 40 aligned with the door 36 is greater than a distance of the opening 34, the door 36 may be moved to a maximum open position, exposing the entire opening 34, to permit access to such a segment 40. In such a situation, the opening distance of the door 36 would be less than the dimension of the segment 40. Furthermore, in alternative arrangements, access to more than one segment 40*a*-40*h* may be permitted through the access opening. Furthermore, additional dividing mechanisms or assemblies may be provided to further subdivide the segments 40 that do not engage to access control mechanism as described below.

Preferably, the access control mechanism 44 includes a first stop, or carousel stop 46, and a second stop, or door stop 48. Preferably, the carousel stop 46 includes a latch 50 coupled to, or otherwise fixed relative to, the housing 28. The latch 50 is movable between a disengaged position and an engaged position. In the disengaged position, the latch 50 does not interfere with the carousel 24 and, thus, the carousel 24 is permitted to rotate relative to the housing 28. In the engaged position, the latch 50 contacts the carousel 24, and preferably the divider 42*b*, to inhibit rotation of the carousel 24 in the direction indicated by the arrow A.

Similarly, the door stop 48 includes a latch 52, which is carried by the door 36 and is movable between a disengaged position and an engaged position. In the disengaged position, the latch 52 does not interfere with the carousel 24 and, thus, the carousel 24 is permitted to rotate in the direction indicated by the arrow A. In the engaged position, the latch 52 permits the door 36 to open in the direction indicated by the arrow B to expose the segment 40*a*. Preferably, the latch 52 contacts the divider 42*a* to stop the door 36 when the first end 36*a* of the door 36 is generally aligned with the divider 42*a*. Accordingly, substantially the entire segment 40*a* is exposed to provide access to a user, without exposing any of the remaining segments 40*b*-40*h*.

Preferably, the access control mechanism 44 also includes a door lock (not shown), which is configured to inhibit the door 36 from being opened until authorized by the system 10. The door lock may be formed by, or associated with, one or both of the carousel stop 46 and door stop 48, or may be a separate mechanism. A preferred embodiment of a door lock is described in greater detail below with reference to FIGS. 5-7.

The carousel stop 46, door stop 48 and door lock may be constructed and operated in any suitable manner, while preferably providing the functions substantially as described above. One preferred embodiment of the carousel stop 46, door stop 48 and door lock is described in greater detail below with reference to FIGS. 5-11. However, other alternative arrangements are also possible. The illustrated structure is preferred because of its repeatable operation, simplicity, reliability, and relatively low implementation cost. The carousel stop 46, door stop 48 and door lock are, desirably, primarily mechanical in nature to provide low-cost and increase reliability. However, arrangements relying more heavily, or entirely, on electronic componentry are also possible.

Preferably, the control unit 18 operates the motor 30 to rotate the carousel 24 about the point P in the direction indicated by the arrow A. Using information regarding the position of the carousel 24 relative to the housing provided by the position sensor 32, the control unit 18 is able to position a desired segment 40*a*-40*h* in general alignment with the opening 34 and door 36. The control unit 18 may then operate the access control mechanism 44 to permit the door 36 to be opened and thereby expose the desired segment 40*a*-40*h*. The control unit 18 preferably keeps track of the items dispensed such that the system 10 is able to determine the dispensing unit 14*a* inventory level.

As described above, the control unit 18 may comprise a number of individual controllers, and other mechanisms, to carry out the desired functions of the dispensing unit 14. For example, the control unit 18 may include central control elements, which are associated with the dispensing unit 14 as a whole, and preferably configured to control certain activities of all of the carousel assemblies 20*a*-20*d*. In addition, the control unit 18 may comprise individual control elements associated with each of the carousel assemblies 20*a*-20*d* and configured to only control functions of the associated carousel assembly 20*a*-20*d*, such as the motor 30 or access control mechanism 44, for example.

Further, the control unit 18 may send a signal to the supply station 12 over the connection 16 when the inventory within the dispensing unit 14*a* falls below a predetermined par level. Alternatively, the supply station 12 may poll the dispensing unit 14*a* for inventory information periodically. The supply station 12 may inform a user of the system 10 when the dispensing unit 14*a* is in need of restocking and may even provide a proposed replacement carousel arrangement for restocking the dispensing unit 14*a*. The supply station 12 may monitor the dispensing units 14*b*-14*d* in a similar fashion. Alternatively, as described above, the dispensing units 14*a*-14*d* may be stand-alone units which provide inventory information to a user through the user interface 18*c* associated with the individual dispensing unit 14*a*-14*b*.

Figure 2:
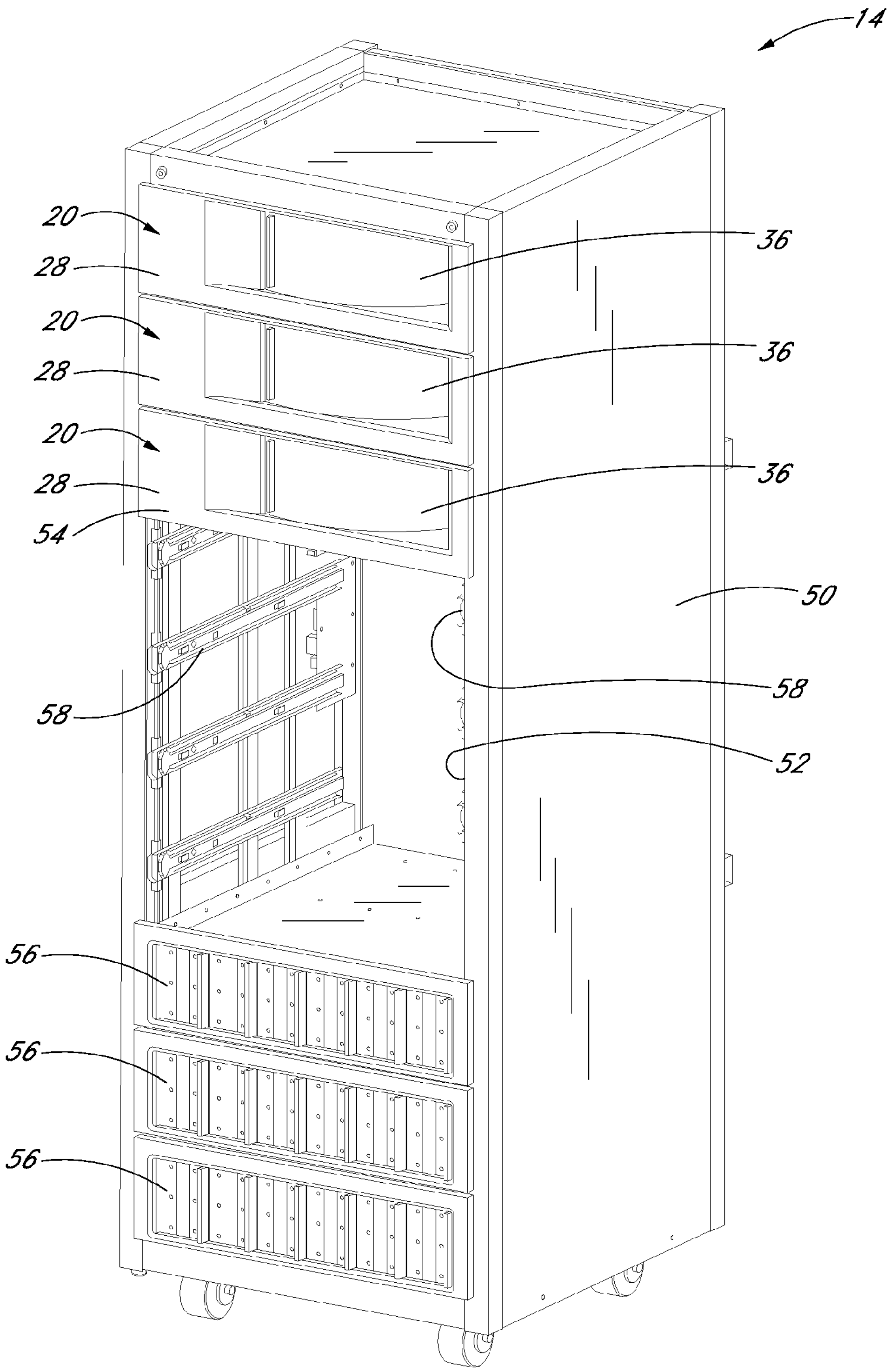
FIG. 2 is a perspective view of one of the dispensing units of FIG. 1 and includes a plurality of modular carousel assemblies within a support structure.

With reference to FIGS. 2-11, a preferred embodiment of the dispensing unit 14 is shown in greater detail. With reference to FIG. 2, the dispensing unit 14 preferably includes a support structure, such as a cabinet 50. The illustrated cabinet 50 is capable of supporting a plurality of carousel assemblies 20 in a vertically-stacked arrangement. Preferably, the cabinet 50 is closed on all sides except for an open front 52, which permits carousel assemblies 20 to be inserted into the cabinet 50 such that a forward face 54 of each carousel assembly 20 is exposed.

The cabinet 50 may also contain other types of dispensing modules, such as a plurality of locker units 56. The locker units 56 preferably communicate with the control unit 18, which controls lockable doors of the locker assemblies 56. In an alternative arrangement, however, the locker units 56 may be replaced by carousel assemblies 20. Preferably, the cabinet 50 also supports the user interface 18*c* (not shown in FIG. 2), which may be configured for insertion into the cabinet 50 in a manner similar to the carousel assemblies 20 or locker units 56.

Desirably, each of the carousel assemblies 20, locker units 56 and user interface 18*c* are supported relative to the cabinet 50 by a pair of slide assemblies 58, which permit the carousel assemblies 20, locker units 56 or user interface 18*c* to be extended from, or retracted into, the cabinet 50. The slide assemblies 58 preferably also permit the carousel assemblies 20, locker units 56 or user interface 18*c* to be disconnected and removed entirely from the cabinet 50 for repair or replacement. In addition, the carousel assemblies 20, locker units 56 and user interface may be selectively lockable to the cabinets 50 to reduce the likelihood of tampering.

Figure 3:
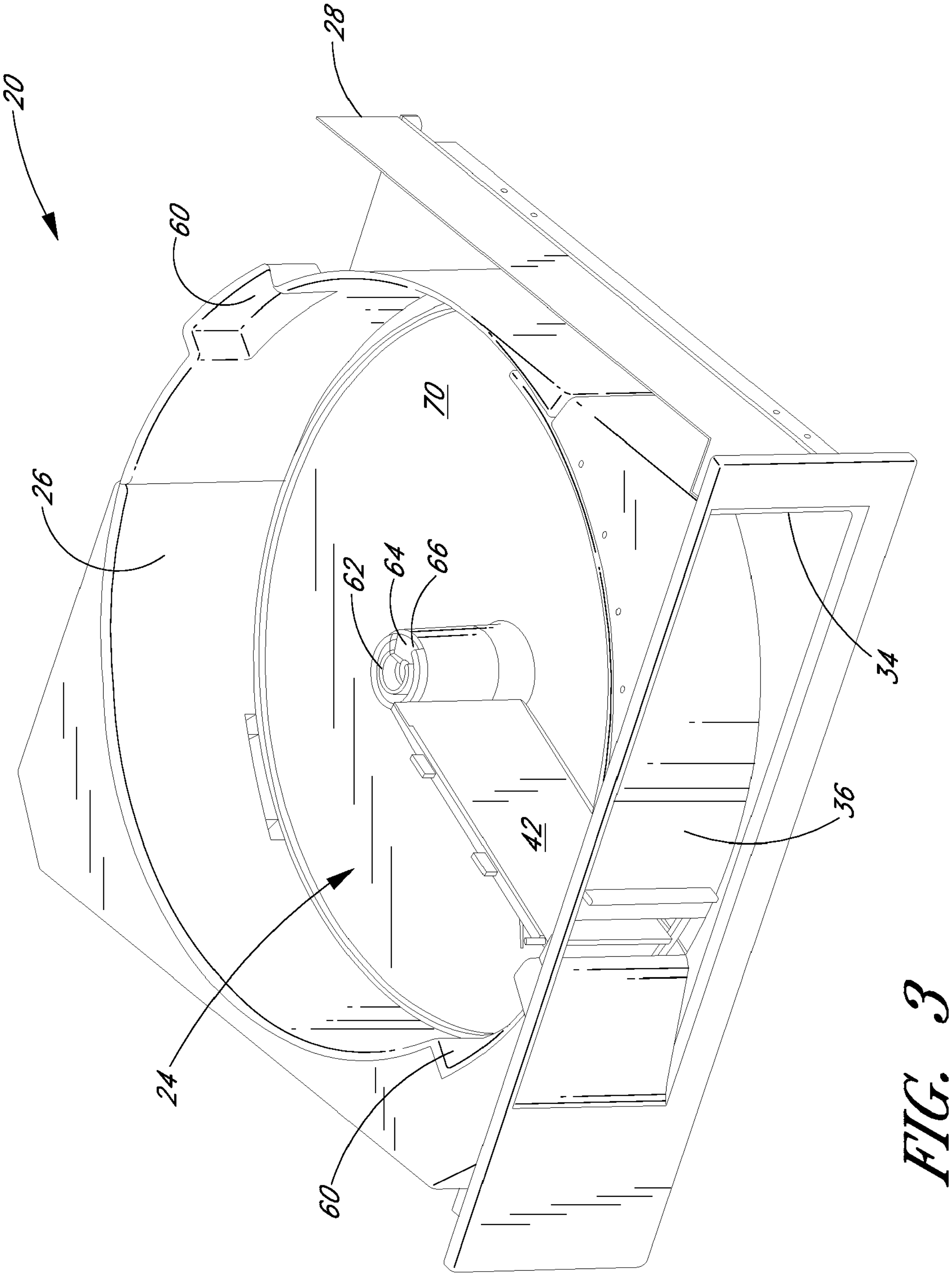
FIG. 3 is a perspective view of one of the carousel assemblies of FIG. 2 removed from the support structure. The carousel assembly includes a rotatable carousel supported within a housing. The housing includes a door which selectively provides access to the carousel.

With reference to FIG. 3, the housing 28 of the carousel assembly 20 defines an interior space 26 configured to receive the carousel 24, as described previously in relation to FIG. 1. In the illustrated embodiment, the interior space 26 is generally cylindrical in shape, but other shapes can be used. The housing 28 may be constructed of any suitable material, such as plastic, metal or a combination thereof. In addition, the housing 28 may be constructed from a multitude of individual pieces assembled together. Desirably, the housing 28 includes a pair of recesses 60 extending outwardly from the interior space 26 to permit a user's hands to access the carousel 24.

The carousel assembly 20 includes a carousel support, including a support shaft assembly 62, which extends vertically upward from a generally central point P (FIG. 1) of the housing 28 and is rotatable relative to the housing 28. The support shaft assembly 62 is configured to support the carousel 24 for rotation relative to the housing 28. Preferably, the support shaft assembly 62 includes a vertically-extending groove 64, which is configured to receive a projection, or key 66, of the carousel 24 to locate the carousel 24 with respect to the support shaft assembly 62. With such an arrangement, the control unit 18 may determine a designated, or zero, position of the carousel 24 relative to the housing 28. Accordingly, the control unit 18 uses this knowledge of the zero position to move the carousel 24 to a desired position relative to the housing 28 and the opening 34.

The support shaft assembly 62 may be supported for rotation relative to the housing 28 in any suitable manner, as may be determined by one of skill in the art. Desirably, the support shaft assembly 62 provides at least some assistance to the carousel 24 in supporting the weight of the dispensable items arranged within the carousel 24. Preferably, the support shaft assembly 62 and carousel 24 are capable of supporting a plurality of dispensable items having an aggregate weight of 100 pounds or more. However, the carousel assembly 20 may be configured for lesser or greater loads as determined by the needs of the user.

Figure 10:
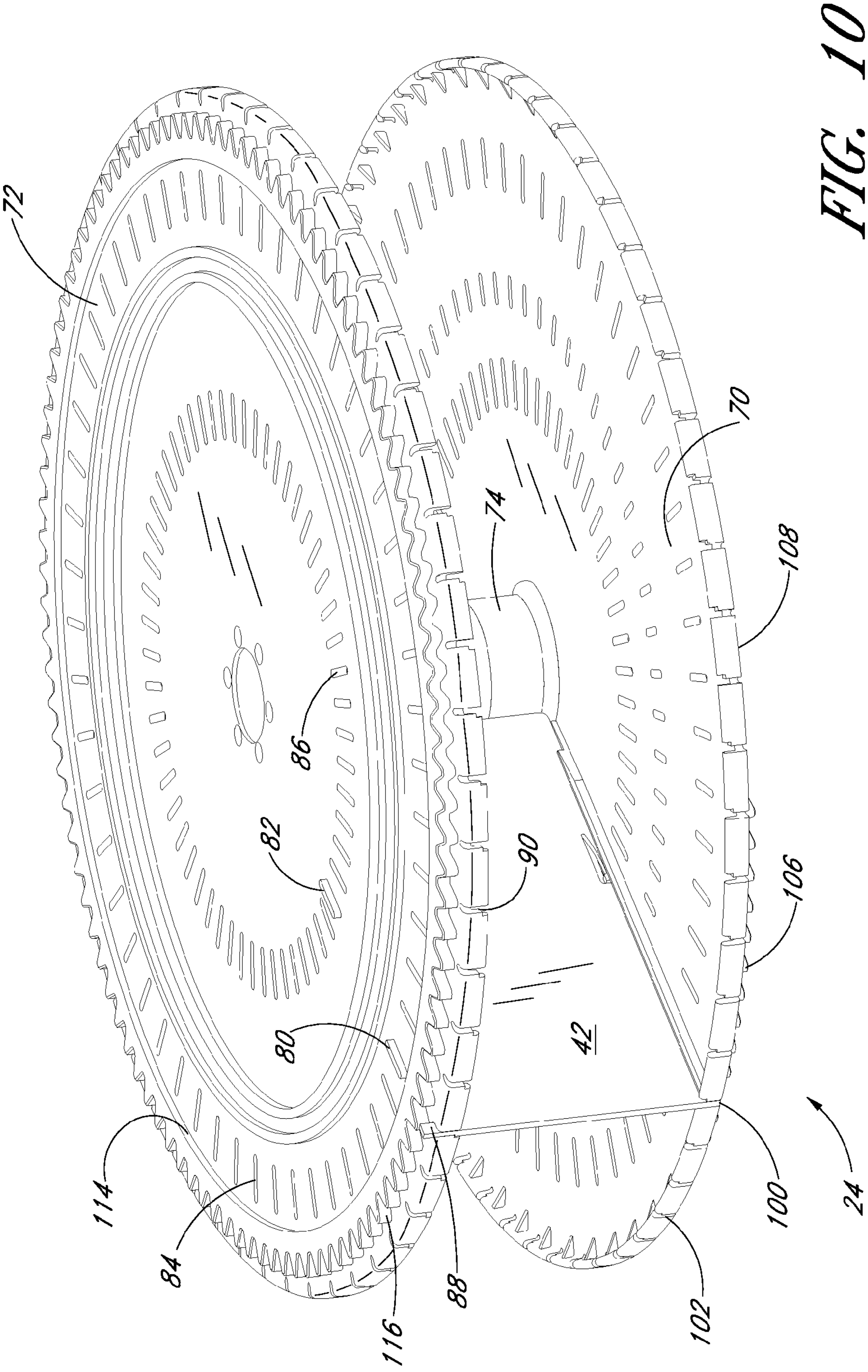
FIG. 10 is a perspective view of the carousel removed from the housing.

With additional reference to FIG. 10, preferably, the carousel 24 includes a lower tray 70 and an upper cover 72 vertically spaced from one another by a support column 74. Preferably, each of the tray 70 and cover 72 are substantially circular, plate-like members, generally corresponding to the available space within the housing 28. In addition, other shapes may also be used. The support column 74 may be a separate piece from the tray 70 and cover 72, or may be monolithically formed with one or both of the tray 70 and cover 72. Alternatively, the support column 74 may be composed of the combination of a distinct member and a portion of the tray 70 and/or the cover 72. The tray 70, cover 72 and column 74 may be interconnected by any suitable means, such as one or more fasteners, for example. Preferably, a loaded carousel 24 can be lifted by grasping the cover 72 without separation of the individual components of the carousel 24.

Preferably, a vertical distance between the tray 70 and the cover 72 is generally equivalent to a vertical height of the opening 34 and door 36. Furthermore, the vertical dimension of the carousel assembly 24 may be varied to suit the items to be dispensed. For example, one dispensing unit 14 may include carousel assemblies 24 of varying vertical dimensions.

As described above, the carousel 24 includes a plurality of dividers 42. For the purpose of clarity, only one divider 42 is illustrated in FIGS. 3 and 10. The dividers 42 separate the space between the tray 70 and the cover 72 into a plurality of segments 40. In the illustrated arrangement, the divider 42 is a vertically oriented wall-defining member extending radially outward from the support column 74 to a peripheral edge of the carousel 24. The divider 42 extends from an upper surface of the tray 70 to a lower surface of the cover 72. However, in alternative arrangements, the divider 42 does not necessarily extend the entire vertical distance between the tray 70 and the cover 72. The dividers 42 may take on a variety of shapes and sizes, but preferably function to maintain items within the individual segments 40 separated from one another and inhibit user access to all but an intended segment 40. Thus, the divider 42 may be formed by a surface feature of the tray 70 or cover 72 or both, if desired. The divider 42 may be constructed of a single piece of material or may be assembled from a number of individual pieces.

Desirably, an upper surface of the divider 42 includes a radially outward positioned tab 80 and a radially inward positioned tab 82. The tabs 80, 82 preferably extend in a vertically-upward direction from an upper surface of the divider 42 through corresponding slots 84, 86 within the cover 72. In addition, preferably, a radially outward edge of the divider 42 includes a projection 88 that extends through a corresponding recess 90 extending inwardly from the peripheral edge of the cover 72.

Figure 6:
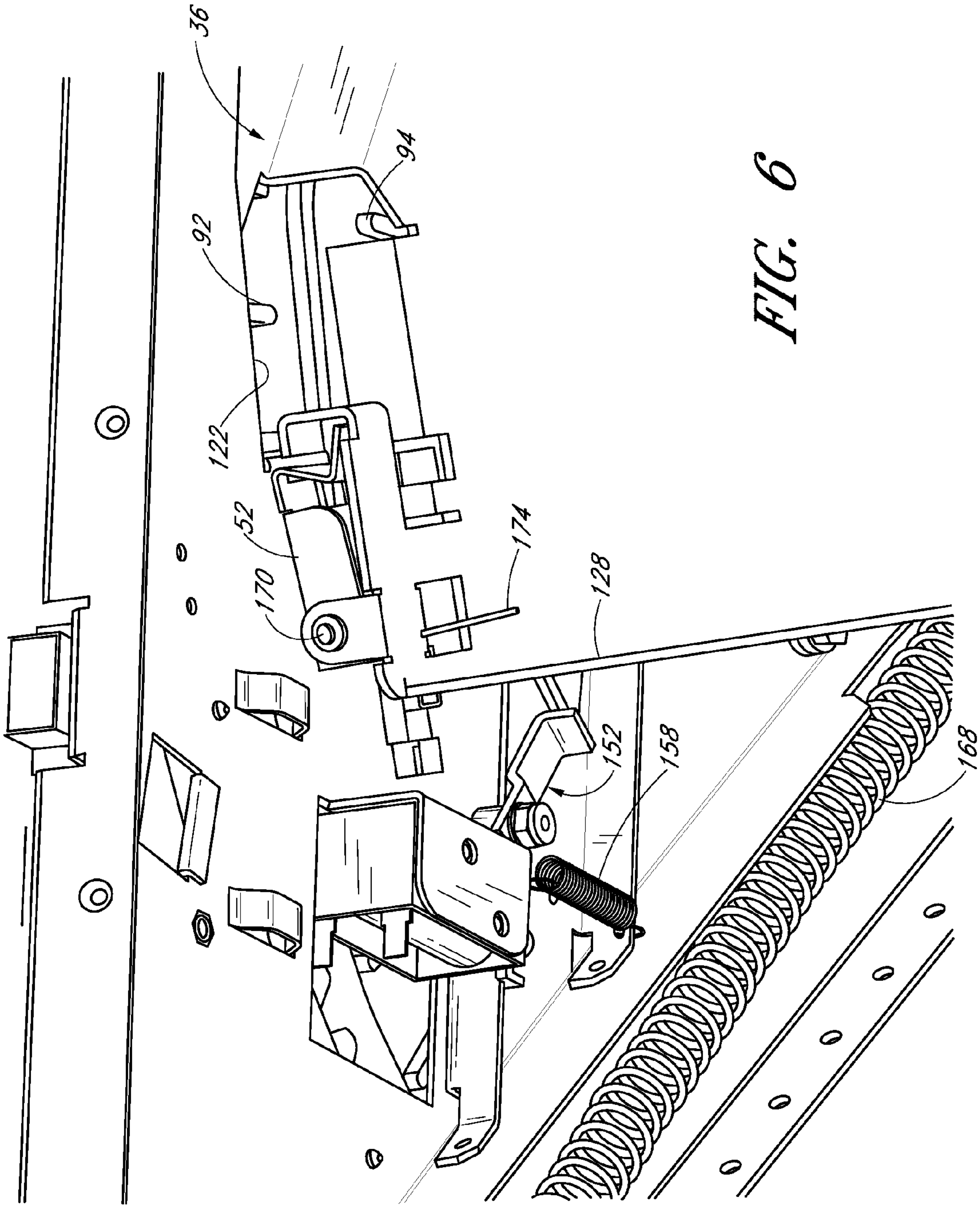
FIG. 6 is a perspective view of the carousel assembly illustrating the door stop and the carousel stop as viewed from below.
Figure 8:
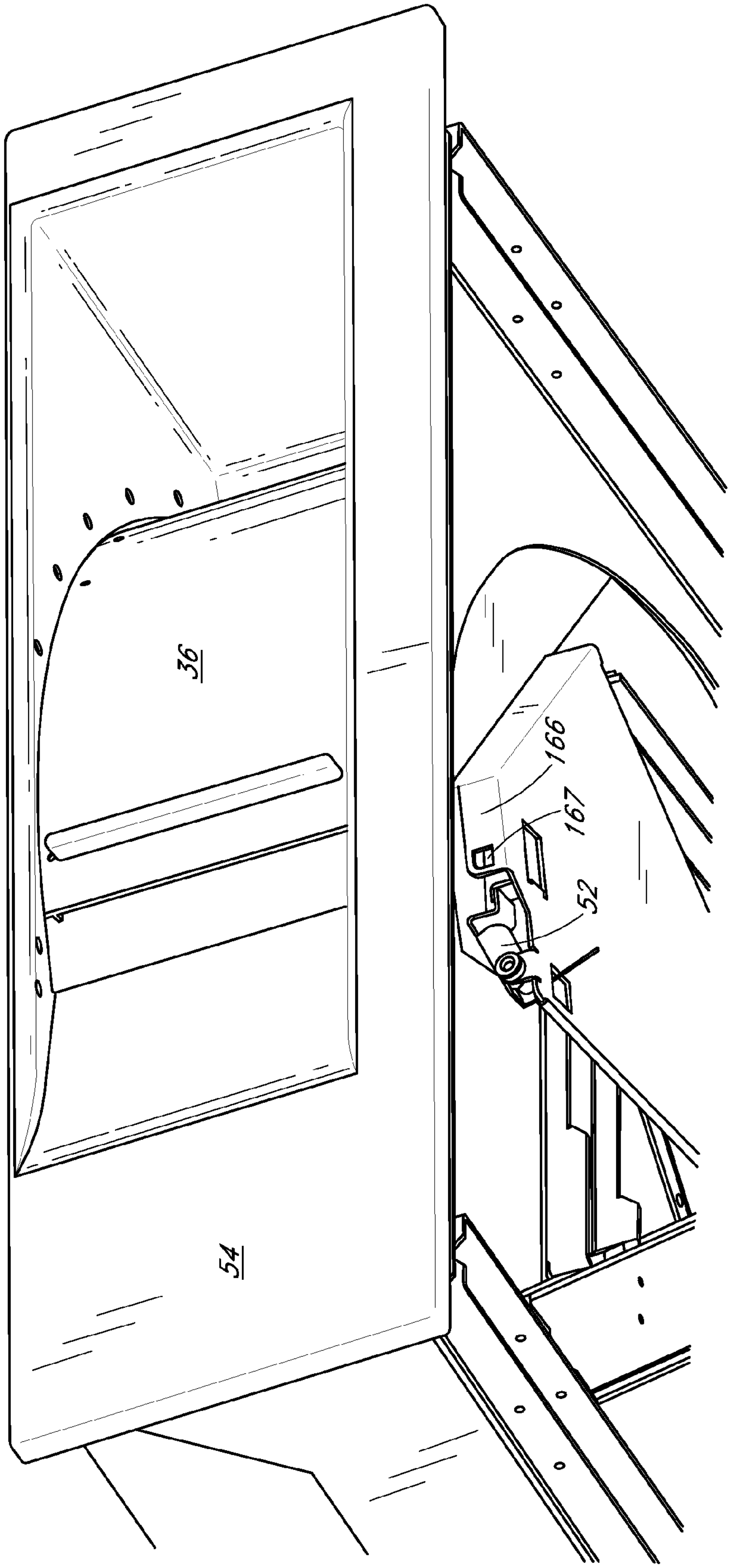
FIG. 8 is a perspective view of the door in a partially open position, as viewed from below.

Similarly, a radially outward positioned tab 92 and a radially inward positioned tab 94 extend in a vertically downward direction from a lower surface of the divider 42 (FIGS. 6 and 8). The tabs 92, 94 are received within corresponding slots 96, 98 defined by the tray 70. In addition, a radially outward edge of the divider 42 includes a projection 100 which extends in a vertically downward direction through a recess 102 extending inwardly from a peripheral edge of the tray 70. Desirably, the tabs 92, 94 and the projections 88, 100 are configured to have a snap-together fit with the slots 84, 86, 96, 98 or the recesses 90, 102, respectively.

The tabs 80, 82, 92, 94 and projections 88, 100 cooperate with the slots 84, 86, 96, 98 and recesses 90, 102, respectively, to secure the divider 42 in a desired position relative to the tray 70 and cover 72. In addition, the dividers 42 may assist in inhibiting relative rotation between the tray 70 and cover 72. Furthermore, the lower tabs 92, 94 preferably are utilized by the access control mechanism 44, as is described in greater detail below.

Preferably, both the tray 70 and the cover 72 include an array of slots 84, 86, 96, 98 and recesses 90, 102 extending around the entire circumference of the tray 70 and cover 72. In arrangement, preferably between about fifty-six and sixty slots 84, 86, 96, 98 and recesses 90, 102 are provided. However, in other arrangements, a lesser or greater number of slots 84, 86, 96, 98 and recesses 90, 102 may be provided.

Desirably, the slots 84, 86, 96, 98 and recesses 90, 102 are equally spaced about the circumference of the carousel 24. The array of slots 84, 86, 96, 98 and recesses 90, 102 provide a large number of possible segment 40 configurations of the carousel 24. In many arrangements, not all of the slots 84, 86, 96, and 98 will be occupied by tabs 80, 82, 92 and 94 of segments 42. That is, segments 42 will not be positioned in every available space. Rather, the positioning of the segments 42 within the carousel 24 may be configured to accommodate the specific sizes and shapes of the dispensable items, thereby reducing unused space. In addition, the carousel 24 may be easily reconfigured by altering the pattern of segment 42 placement.

As described above, the carousel assembly 20 includes a motor 30 that is configured to rotate the carousel assembly 24 relative to the housing 28. In the illustrated arrangement, the motor drivingly engages the carousel 24 through a gear train arrangement. Specifically, the tray 70 includes a plurality of gear teeth 106 extending about a circumference of the tray 70. The gear teeth 106 are formed on a radially facing surface defined by an annular rib 108, which projects downwardly from the remainder of a lower surface of the tray 70. Desirably, the rib 108 and gear teeth 106 are set back a relatively small distance from a radially outward edge of the tray 70.

A gear 110 is drivingly connected to the motor 30 and includes gear teeth 112 which are configured to engage the gear teeth 106 of the tray 70 such that the carousel 24 may be rotated by the motor 30. However, other drive arrangements between the motor 30 and the carousel 24 are also possible, such as a drive chain or drive belt arrangement, for example.

The cover 72 also includes an annular rib 114 defining a plurality of gear teeth 116. Thus, the cover 72 may be interchangeable with the tray 70. As a result, the cost of manufacturing the system 10 may be reduced by reducing the total number of components and related tooling that is necessary. However, preferably, at least the cover 72 is constructed from an at least partially transparent material to allow visual inspection of the contents of the carousel 24 through the cover 72. Alternatively, the teeth 116 of the cover 72 may be used for other purposes, such as position sensing of the carousel 24, for example.

Figure 5:
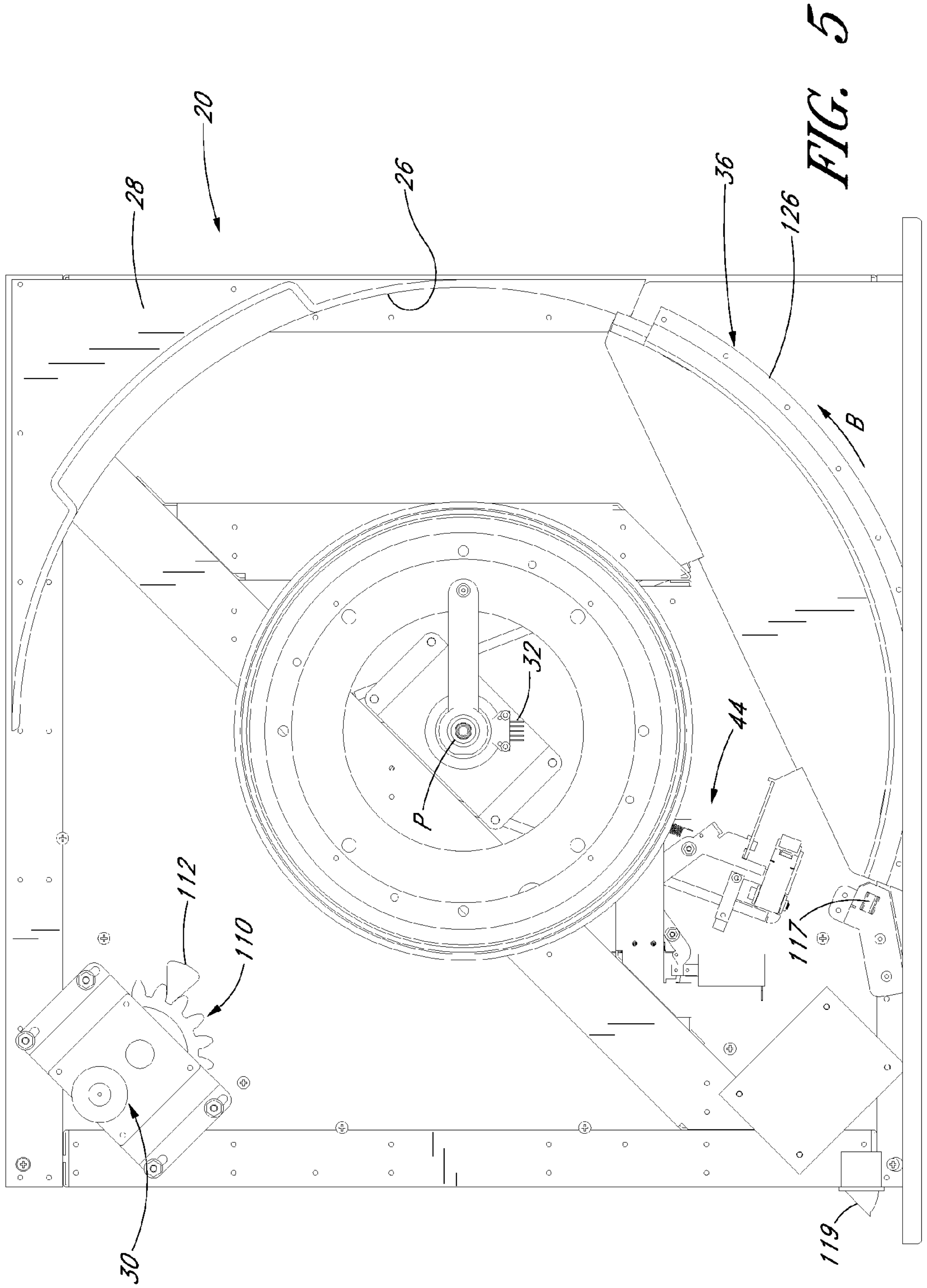
FIG. 5 is a top plan view of the carousel assembly of FIG. 3 with the carousel and a floor of the housing removed to expose a door stop and a carousel stop.

As described above, with reference to FIG. 1, the carousel assembly 20 preferably includes a position sensor 32 or position sensing arrangement. With reference to FIG. 5, the illustrated position sensor 32 is an angular encoder that senses the angular position of the support shaft 62 relative to the housing 28. Because the carousel 24 is keyed for rotation with the support shaft 62, as described above, the position sensor 32 is also capable of providing information regarding the position of the carousel 24, including a zero position. That is, the carousel 24 is assembled with a known and repeatable orientation relative to the support shaft 62.

In addition, preferably, the carousel assembly 20 includes a divider sensor 117 configured to sense the presence of a divider 42. Thus, as the carousel 24 is rotated, the divider sensor 117 senses the dividers 42 and provides that information to the control unit 18. Preferably, upon insertion of a new carousel 24, the dispensing unit 14 rotates the carousel 24 at least one complete rotation such that a position of all of the dividers 42 may be determined. The control unit 18 can use the divider 42 information from the divider sensor 117, along with the position information from the position sensor 32 to create a map of the carousel segment 40 arrangement, preferably including the size and position of each segment 40 in relation to the known, zero (or home) position of the carousel 24. Furthermore, the divider sensor 117 may be configured and located to provide verification that the carousel 24 is positioned for correct operation of the access control mechanism 44.

The carousel assembly 20 may also include other sensors, such as a door sensor 118 configured to indicate to the control unit 18 whether the door 36 is in a closed or open position, for example. Preferably, the carousel assembly 20 also includes a carousel assembly sensor 119 configured to indicate to the control unit 18 whether the carousel assembly 20 is in a closed or open position relative to the cabinet 50. Other sensors or devices configured to provide relevant information to the control unit 18 may also be provided.

Figure 4:
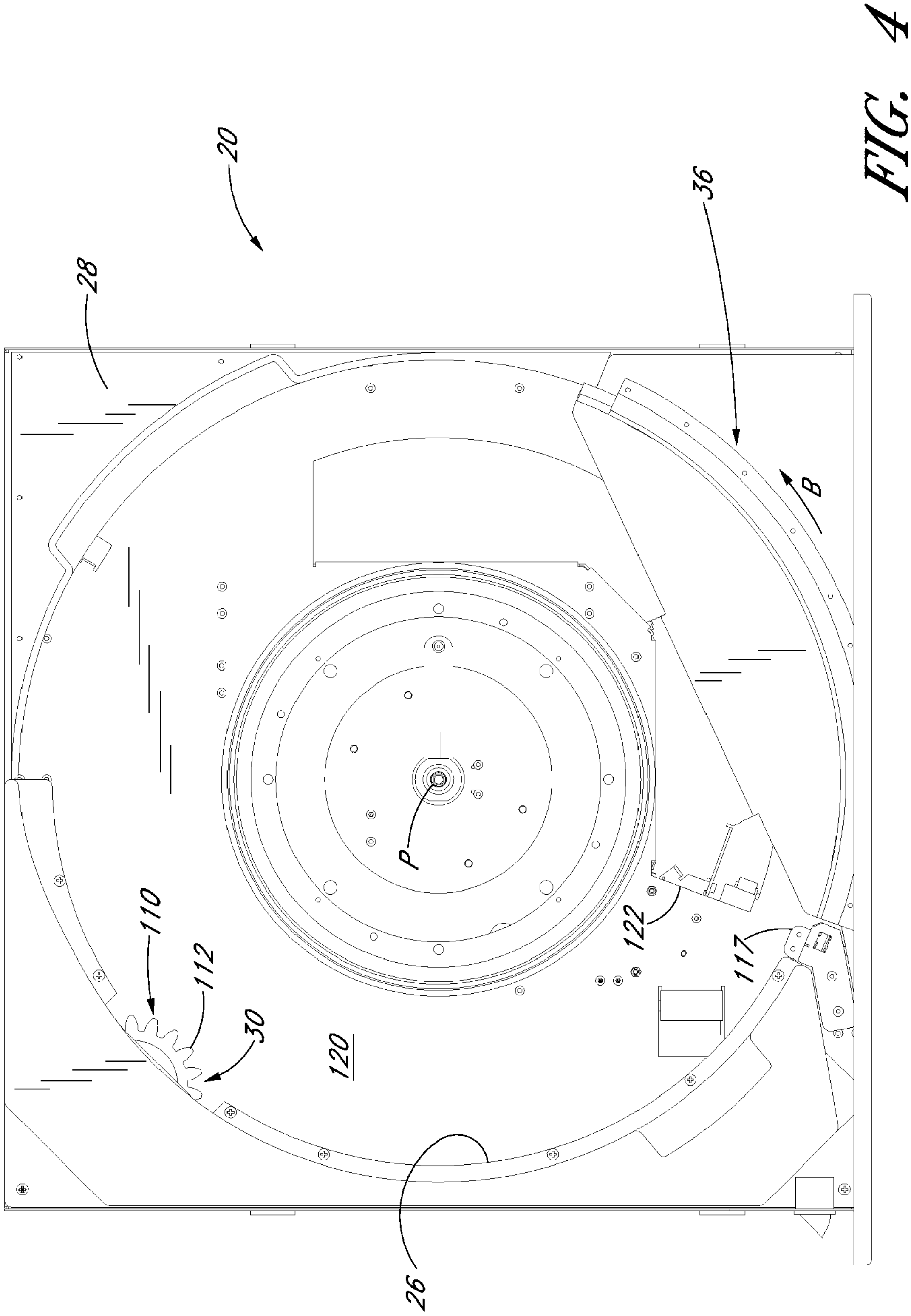
FIG. 4 is a top plan view of the carousel assembly of FIG. 3 with the carousel removed.

With reference to FIG. 4, the housing 28 includes a floor 120 which defines a bottom surface of the interior space 26. In FIG. 5, the floor 120 is removed to illustrate additional components of the carousel assembly 20. The floor 120 includes an opening 122 near a forward end of the housing 28 to permit portions of the access control mechanism 44 to interact with the carousel 24, while protecting the remaining portions of the access control mechanism 44 from damage due to direct contact, dust, water or other foreign objects.

Figure 11:
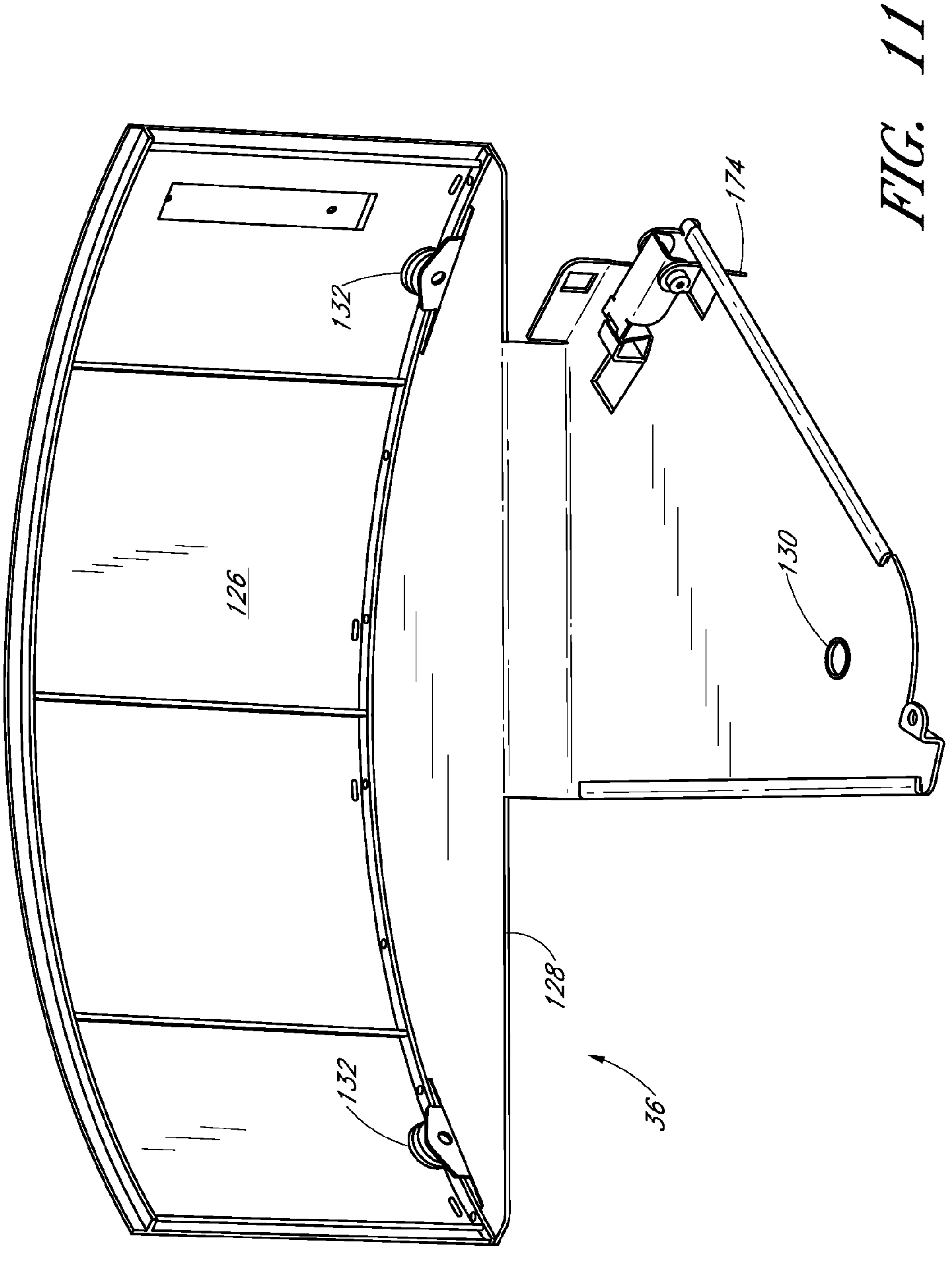
FIG. 11 is a perspective view of the door removed from the housing.

With reference to FIGS. 1, 4 and 11, the illustrated door 36 includes an arcuate shaped front panel portion 126, which is oriented in a vertical manner and covers the opening 34 of the housing 28 in a closed position of the door 36. In the illustrated arrangement, the front panel 126 of the door 36 extends an angular distance of approximately 90 degrees about the center point P of the carousel 24 from a first end to a second end to correspond with the opening 34 which also defines an angle of generally 90 degrees about the point P from a first end to a second end. Other sizes of the door may also be used. For example, a door may be adapted to correspond with an opening that spans more than one side of the cabinet 50.

The door 36 also includes a base portion 128, which extends radially inward from a lower end of the front panel portion 126. The base portion 128 includes an aperture 130 which permits the door 36 to be rotatably connected to the housing 28 such that the door 36 may be rotated about the center point P of the housing 28 between a fully closed position, wherein the opening 34 is substantially blocked, to a fully open position, wherein the opening 34 not blocked. The door 36 may also include a pair of rollers 132 configured to roll along a corresponding surface of the housing 28 or the door can rest on rollers mounted on the housing to provide additional support to the door 36 and provide smooth opening and closing movement of the door 36.

As described above, preferably, the access control mechanism 44 includes a carousel stop 46 and a door stop 48. The carousel stop 46 preferably inhibits rotation of the carousel 24 in the direction indicated by the arrow A in FIG. 1. The door stop 48 preferably inhibits opening movement of the door 36 in the direction of the arrow B in FIG. 1 beyond the segment 40 of the carousel 24 that is aligned with the opening 34 of the housing 28. In addition, the illustrated access control mechanism 44 includes a door lock 140 configured to lock the door 36 in a closed position and selectively permit the door 36 to be opened in the direction indicated by the arrow B.

Figure 7:
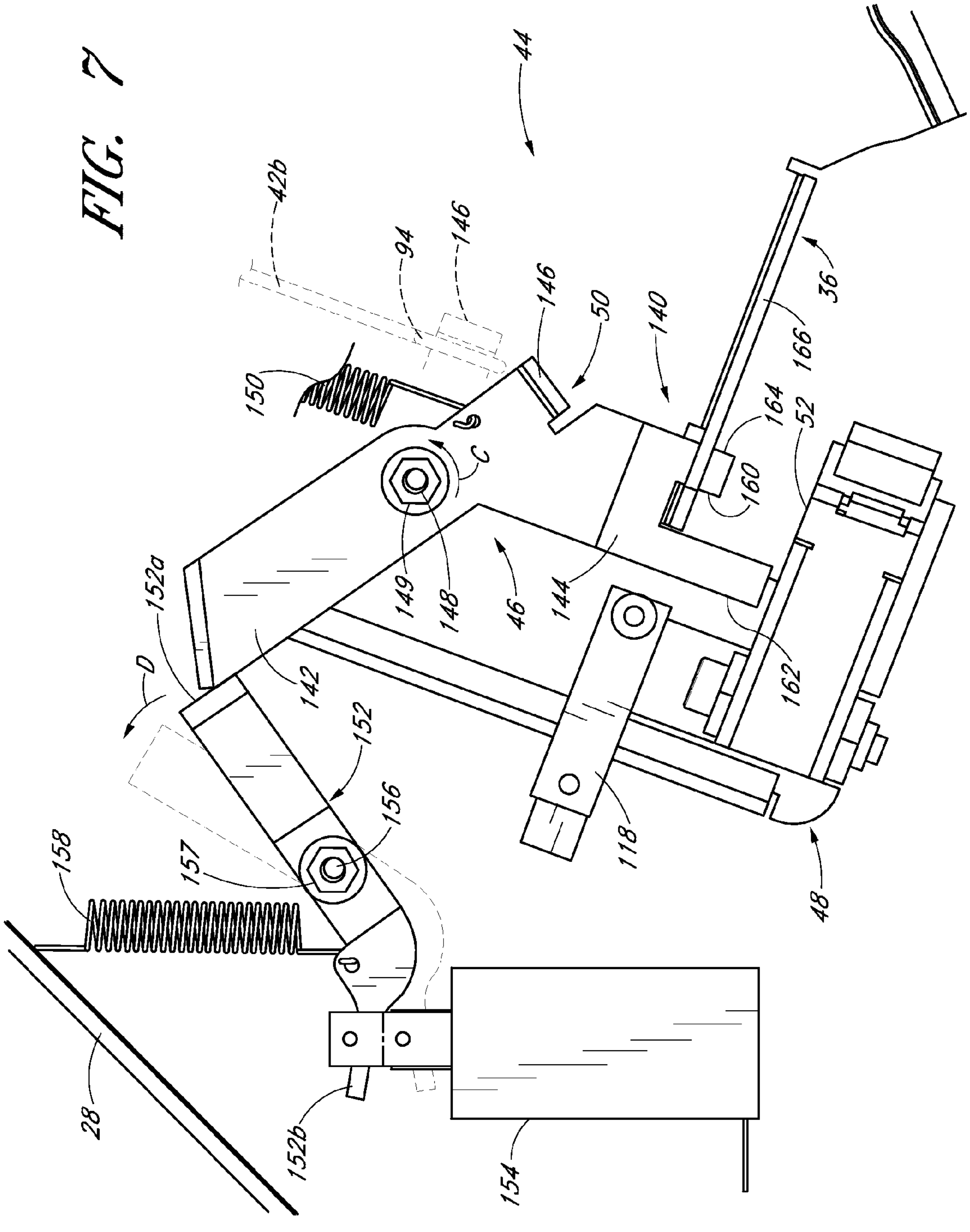
FIG. 7 is a top plan view of the door stop and carousel stop of FIGS. 5 and 6. A normal, or disengaged, position is shown in solid line, while an engaged position of the door stop and carousel stop is shown in phantom.

With reference to FIG. 7, the illustrated carousel stop 46 includes the latch 50, which is generally L-shaped when viewed from above. The generally L-shaped latch 50 includes a first leg portion 142 and a second leg portion 144. The heel of the converging portion between the first leg 142 and the second leg 144 includes a stop tab 146. The stop tab 146 preferably extends in a vertically upward direction from the main body of the latch 50.

The latch 50 is assembled to the housing 28 for rotation about an axis of a shaft 148. The latch 50 is secured to the shaft 148 by a fastener, such as a nut 149, which includes internal threads that mate with external threads (threads not shown in FIG. 7) formed on an upper end of the shaft 148. A biasing member, such as a spring 150, is connected between the latch 50 and the housing 28 to apply a force to the latch 50 tending to rotate it about the shaft 148 in the direction indicated by the arrow C in FIG. 7.

In a disengaged position, shown in solid line in FIG. 7, the latch 50 is held against the biasing force of the spring 150 by a release lever 152. The release lever 152 includes a first end **152*a* configured to abut the latch 50 and a second end 152*b* coupled to an actuator, such as a solenoid 154, for instance. The release lever 152 is rotatably coupled to the housing 28 for rotation about an axis of a shaft 156. The release lever 152 is secured to the shaft 156 by a fastener, such as a nut 157, which includes internal threads that mate with external threads (threads not shown in FIG. 7) formed on an upper end of the shaft 156**.

A biasing member, such as a spring 158 for instance, normally biases the release lever 152 to the position illustrated in solid line in FIG. 7 abutting the latch 50 and holding it in the disengaged position. The solenoid 154, when actuated, is configured to rotate the release lever 152 in the direction indicated by the arrow D in FIG. 7, against the biasing force of the spring 158, to release the latch 50 from its disengaged position. The biasing force of the spring 150 rotates the latch 50 in the direction indicated by the arrow C in FIG. 7 so that the stop tab 146 moves into a position to block the radially inward tab 94 of the divider 42, as illustrated in phantom in FIG. 7. After the actuation of the solenoid 154, the biasing force of the spring 158 resets the release lever 152 into the position shown in solid line in FIG. 7.

As indicated above, the access control mechanism 44 also includes the door lock 140. In the illustrated arrangement, the leg 144 of the latch 50 defines a portion of the door lock 140. The end of the illustrated leg 144 is generally J-shaped when viewed from above and defines a recess 160 between a long side 162 of the J-shaped end and a short side 164 of the J-shaped end. A vertical wall portion 166 of the door 36 includes an opening 167 (FIGS. 8 and 9), which receives the short side 164 of the J-shaped end of the leg 144. Accordingly, a portion of the vertical wall 166 is in engagement with the recess 160, when the latch 50 is in its disengaged position, such that the door lock 140 inhibits the door 36 from opening.

When the latch 50 is moved to its engaged position (as illustrated in phantom in FIG. 7) due to the biasing force of the spring 150, the vertical wall 166 of the door 36 is released from the recess 160. The long side 162 of the J-shaped end of the leg 144 may be configured to apply a force to the vertical wall 166 to move the door 36 toward an opening direction. In addition, a biasing member, such as a spring 168 (FIG. 6), preferably is connected between the door 36 and the housing 28 and preferably is arranged to bias the door 36 in an opening direction, as indicated by the arrow B in FIG. 1. Thus, when released from the door lock 140, the door 36 can be moved toward an open position by the biasing force of the spring 168 until the door 36 is stopped by the door stop 48, as is described in greater detail below.

When the door 36 is moved to a closed position by a user of the system 10, the vertical wall 166 of the door 36 abuts the long side 162 of the J-shaped end of the leg 144 to bias the latch 50 to the disengaged position. While moving toward the disengaged position, the leg 142 of the latch 50 contacts and then rotates the release lever 152 in the direction indicated by the arrow D until the leg 146 is able to pass the end **152*a* of the release lever 152. The biasing force of the spring 158 rotates the release lever 152 back into its normal position, as illustrated in solid line in FIG. 7, to abut the leg 142 of the latch 50 and lock the door 36** in the closed position.

Figure 9:
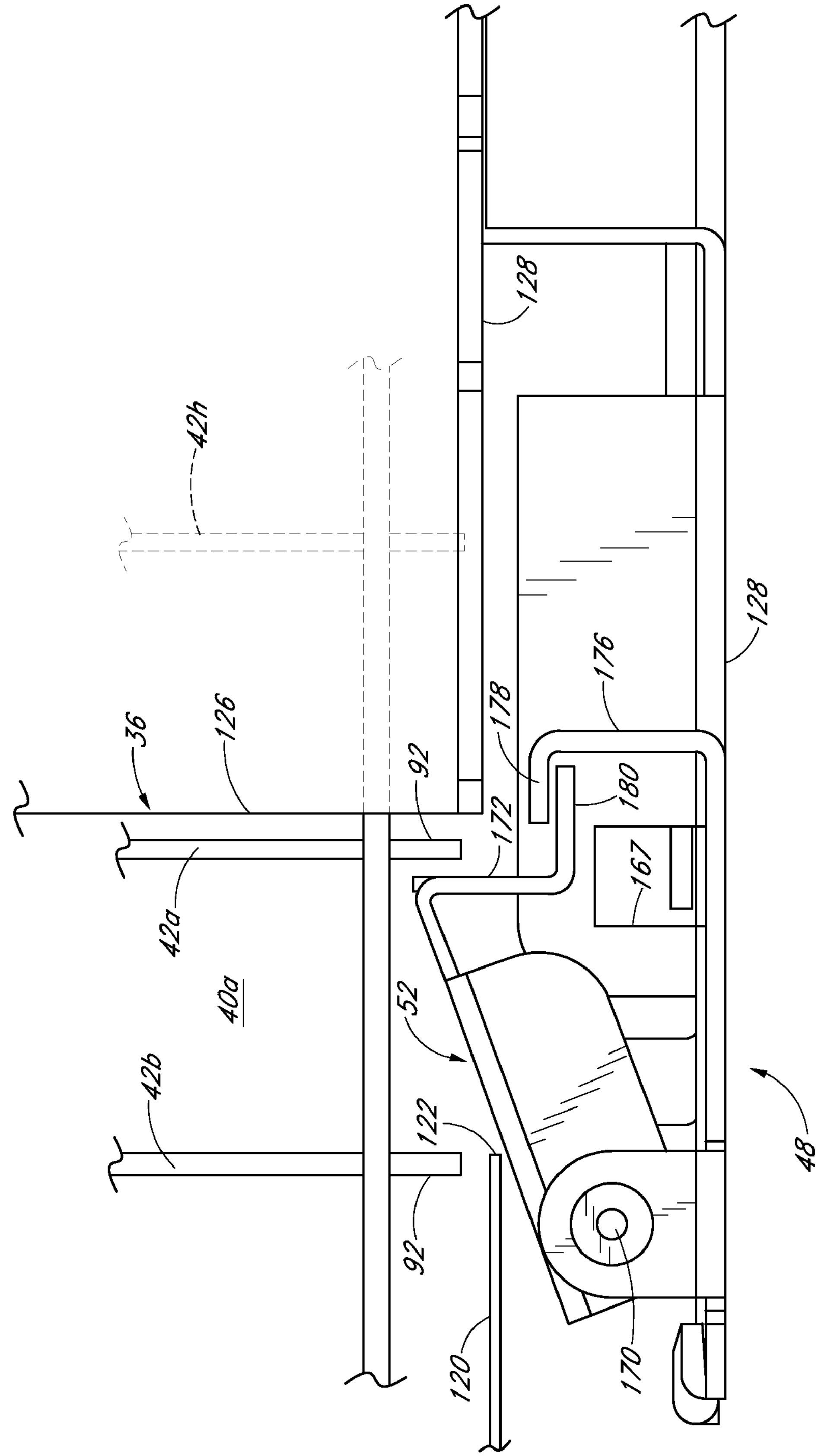
FIG. 9 is a side view of the door and door latch assembly with the door in a partially open position.

With reference to FIGS. 6-9, the door stop 48 includes the latch 52 which is configured, in an engaged position of the illustrated latch 52, to contact a radially outward tab 92 of the divider **42*a* to limit the distance that the door 36 may open. The latch 52 is moveable from a disengaged position when the door is in a closed position, shown in FIG. 6, to an engaged position when the door 36 is opened, as shown in FIGS. 8 and 9. In the disengaged position, the latch 52 does not interfere with the tabs 92 of the carousel 24 and, thus, the carousel 24 is permitted to rotate relative to the housing 28. In the engaged position, the latch 52 projects upwardly to interfere with the tab 92 first encountered as the door 36** is moved in an opening direction.

The latch 52 is rotatably supported on the base portion 128 of the door 36 for rotation about an axis of a generally horizontally-oriented shaft 170. In the illustrated arrangement, the latch 52 is secured to the shaft 170 by a fastener, such as a nut 171, which includes internal threads that mate with external threads (not shown in FIG. 9) formed on an end of the shaft 170. The latch 52 defines a generally vertically oriented stop surface 172, which is configured to contact the radially outward positioned tab 92 of the divider 42*a* when the latch 52 is in the engaged position. A biasing member, such a torsion spring 174, applies a force to the latch 52 tending to bias the latch 52 about the shaft 170 toward the engaged position. A projecting tab 176 of the base portion 128 of the door defines a stop 178, which contacts a tab 180 of the latch 152 to limit upward movement of the latch 52 and defines the engaged position.

When the door is in the closed position, preferably the floor 120 of the housing 28 contacts the latch 52 to bias it, against the resistance of the spring 174, into the disengaged position, as illustrated in FIG. 6. When the door is moved in an opening direction, the biasing force of the spring 174 rotates the latch 52 in an upward direction through the opening 122 of the floor 120 to the engaged position of the latch 52, as shown in FIG. 9.

In operation of the system 10, a user communicates to the dispensing unit 14 a desired item. The control unit 18 determines the location of the item and activates the motor 30 to move the appropriate segment 40*a*-40*h* into alignment with the opening 34 and the door 36 utilizing feedback information from the position sensor 32, or other position-determining mechanism. For example, as illustrated in FIG. 1, the segment 40*a* is generally aligned with the opening 34 and door 36. Desirably, when substantially aligned with the opening 34 and door 36, the divider 42*b* of the segment 40*a* is positioned such that the stop tab 146 of the carousel stop 46 will be positioned adjacent the tab 94, in the engaged position of the latch 50, to inhibit rotation of the carousel 24 in the direction indicated by the arrow A in FIG. 1. Such a position of the segment 40*a* of the carousel 24 relative to the latch 50 is illustrated in FIG. 7.

Once the segment 40*a* is aligned with the opening 34 and door 36, the control unit 18 activates the solenoid 154 to rotate the release lever 152 in the direction indicated by the arrow D in FIG. 7, and release the latch 50. The spring 150 applies a force to the latch 50 to rotate the latch 50 in the direction indicated by the arrow C in FIG. 7. As a result, the latch 50 moves to a position to block the tab 94 of the divider 42*b* and to release the door 36, as illustrated in phantom in FIG. 7. The spring 168 biases the door in the door opening direction as indicated by the arrow B in FIG. 1.

As the door is opened, the biasing force of the spring 174 rotates the door stop latch 52 into its engaged position. The force of the spring 168 rotates the door 36 in the opening direction until the stop surface 172 of the latch 52 contacts the tab 92 of the divider 42*a*. Accordingly, the user is permitted access to the segment 40*a* and is substantially inhibited and preferably prevented from accessing the remainder of the segments 40*b*-40*h*. In the event that the segment 40*a* has an angular dimension greater than the angular dimension of the opening 34, the door 36 would move to its fully open position because there would be no tab 92 to stop the door 36 prior to the fully opened position.

The user is then able to retrieve or replace the desired item into the segment 40*a*. Preferably, the user is prompted to close the door 36, such as through the user interface 18*c*, visual indicator or audible alarm, for example. Alternatively, the door 26 could be closed automatically, such as being driven by a motor, for example.

In the illustrated arrangement, the door 36 is moved toward the closed position against the biasing force of the spring 168 until the vertical wall 166 engages the long side 162 of the J-shaped leg 144 of the door lock 140. Further closing movement of the door 36 rotates the latch 50 toward its disengaged position. The leg 142 of the latch 50 contacts the end 152*a* of the release lever 152 to momentarily bias the release lever 152 in the direction indicated by the arrow D in FIG. 7 so that the end 142 of the latch 50 may pass. Once the leg 142 of the latch 50 has passed beyond the end 152*a* of the release lever 152, the force of the spring 158 biases the release lever 152 into its normal position, wherein it abuts the leg 142 of the latch 50 to secure the latch 50 in its disengaged position, as illustrated in FIG. 7. In addition, the floor 120 of the housing 28 biases the latch 52 of the door stop 48, against the biasing force of the spring 174, into the disengaged position of the latch 52, as illustrated in FIG. 6.

An advantage of the present system 10 is that the distance the door 36 is permitted to open is determined by the distance between the tabs 94, 92 of the dividers 42*a*, 42*b* that bound the segment 40*a* aligned with the opening 34 and door 36, unless that distance is greater than the maximum opening distance of the door 36. Thus, the opening distance of the door 36 is automatically regulated by the placement of the dividers 42*a*, 42*b*. As a result, the dispensing unit 20 may be reconfigured simply by adjusting the position of the dividers 42*a*, 42*b* with respect the carousel 24 into a desired arrangement of the segments 40.

Although the above-described arrangement is preferred, at least in part, due to its relatively low-cost, easy configurability and reliable operation, other suitable arrangements for positioning the carousel 24 and controlling the opening distance of the door 36 may also be used. For example, such an arrangement may rely on more complex sensing arrangements and more complex electronic components, such as motor-driven latches.

Figure 12:
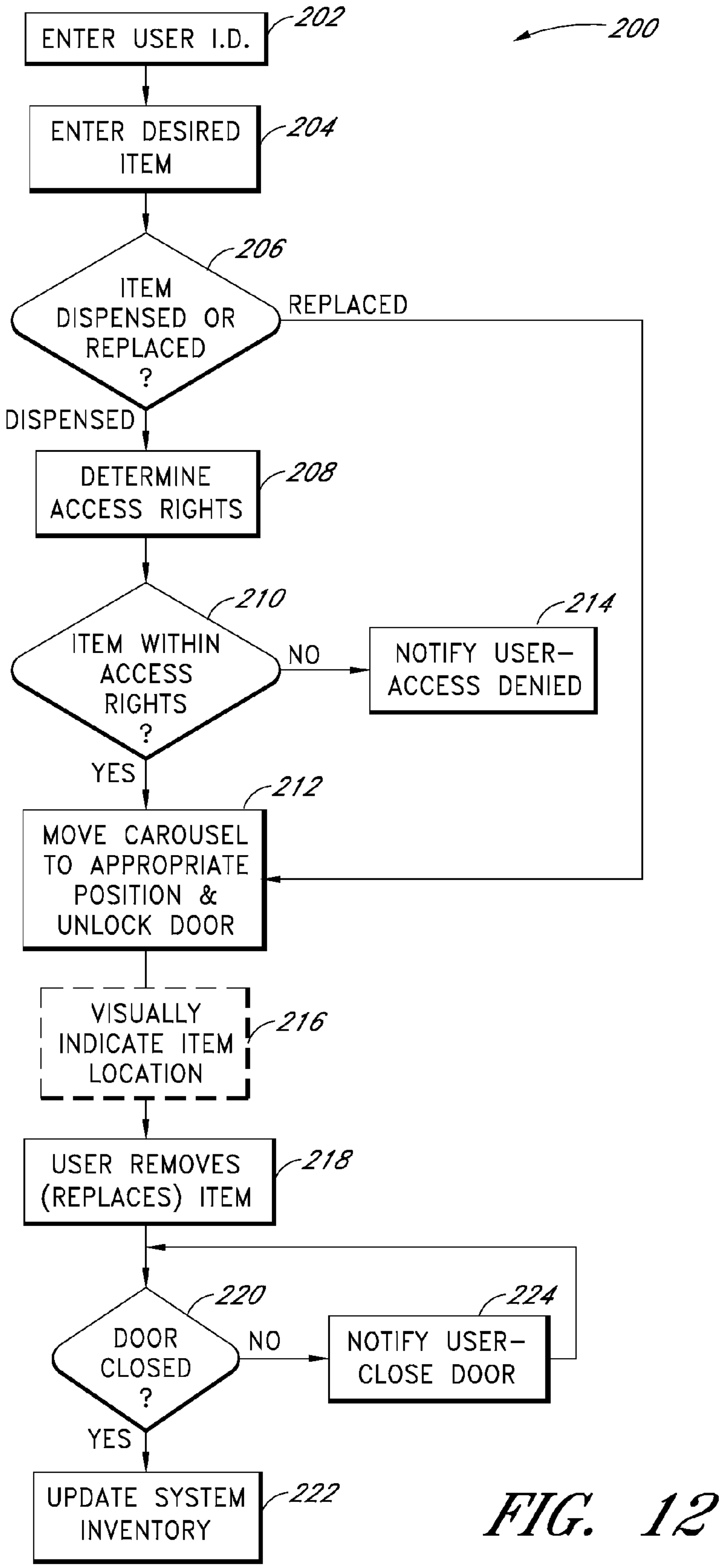
FIG. 12 is a flow diagram of a preferred method for dispensing items from or replacing items to the dispensing system of FIGS. 1-11.

With reference to FIG. 12, a preferred method is illustrated for dispensing an item from the system 10 or returning an item to the system 10. Preferably, the method 200 includes entering an appropriate user identification into the system 10 at block 202. For simplicity, the method illustrated in FIG. 12 assumes that the user is an authorized user of the system 10 possessing a valid user identification. If the user does not have a valid user identification, access to the system 10 may be denied and an appropriate message may be displayed to the user, preferably via the user interface 18*c*. The entry of user identification at block 202 may be accomplished by any suitable method, such as entering an identification number into the user interface 18*c*, or by an ID card including a magnetic data strip or barcode, transponder, for example.

At block 204, the user enters the item desired to be dispensed or replaced into the system 10. The entry of the desired item at block 204 may be accomplished by any of a number of suitable methods. For example, the user could enter a part identification number into the system 10 using the user interface. Alternatively, the user could browse or search a list of item descriptions displayed on the display screen of the user interface 18*c* and select a desired item from the listed items.

At block 206, the system 10 requests the user to indicate whether the desired item is to be dispensed by the system 10 or replaced to the system 10. If the user responds that the item is to be dispensed, the method 200 determines the access rights of the user at block 208. The access rights of the system users may be based on any of a variety of factors, including department or security level, for example. The access rights may be stored in the memory 18*b* of one or more of the dispensing units 14*a*-14*d* or in a memory of the supply station 12 or other remote component of the system 10, or both. Alternatively, the access rights may be stored on the user identification, if appropriate. Other arrangements for providing the system 10 with the access rights of the user may also be used, as will be appreciated by one of skill in the art.

At block 210, the method 200 compares the desired item to the user's access rights and, if the item is within the user's access rights, the method 200 moves to block 212, wherein the system 10 moves the carousel 24 to the appropriate dispensing position and unlocks the door 36. Conversely, at block 210, if the item is not within the access rights of the user, the system 10 notifies the user that access to the desired item is denied at block 214, such as by displaying a message on the display screen of the user interface 18*c*, for example.

Returning to block 206, if the user has indicated that the item is to be replaced, the method 200 preferably proceeds directly to block 212, wherein the system 10 moves the carousel 24 to the appropriate position and unlocks the door 36 so that the item may be replaced to the system 10. Alternatively, the method 200 may require a user to proceed through the activities of blocks 208 and 210, as described above, prior to being permitted to return an item to the system 10. A sensor can be configured to determine if the item was replaced. For instance, a weight scale, vision-based or RF-based sensor, or other suitable arrangement may be used.

At block 216, optionally, the system 10 may visually indicate the appropriate location for dispensing or replacing the desired item. Such a feature is beneficial when the associated dispensing unit 14 includes a plurality of carousel assemblies 20. The visual indicator may be one or more LED lights (not shown) associated with a particular carousel assembly 20*a*-20*d*. Other visual indicators may also be used, as well as other methods for indicating the appropriate carousel assembly 20*a*-20*d*.

At block 218, the user removes or replaces the item from the exposed segment 40*a*-40*h* of the appropriate carousel assembly 20*a*-20*d*. Preferably, the user also closes the door 36 once the item has been removed or replaced. At block 220, the method includes determining whether the door 36 has been closed, preferably using the door sensor 118. If the door 36 has been closed, the method moves to block 222 and updates the system inventory to acknowledge the item that has been taken or replaced.

At block 220, if the door 36 has not been closed, the method 200 includes notifying the user to close the door 36 at block 224. The method 200 then returns to step 220 wherein the system 10 determines if the door 36 has been closed. The method 200 then repeats steps 220 and 224 until the door 36 has been closed by the user and then moves to block 222 wherein the system inventory is updated. The system inventory can be configured to track what user has accessed which segment 40, along with other information that may be desired for analysis of user habits.

The method 200 illustrated in FIG. 12 is merely a preferred method of operation for the described system 10. Thus, the method 200 may be modified to suit the particular requirements or criteria of a particular embodiment of the system 10. For example, not all of the activities may be included in the method 200 and additional activities may be performed. Further, alternative activities may take the place of the one or more activities of the method 200 described above.

Figure 13:
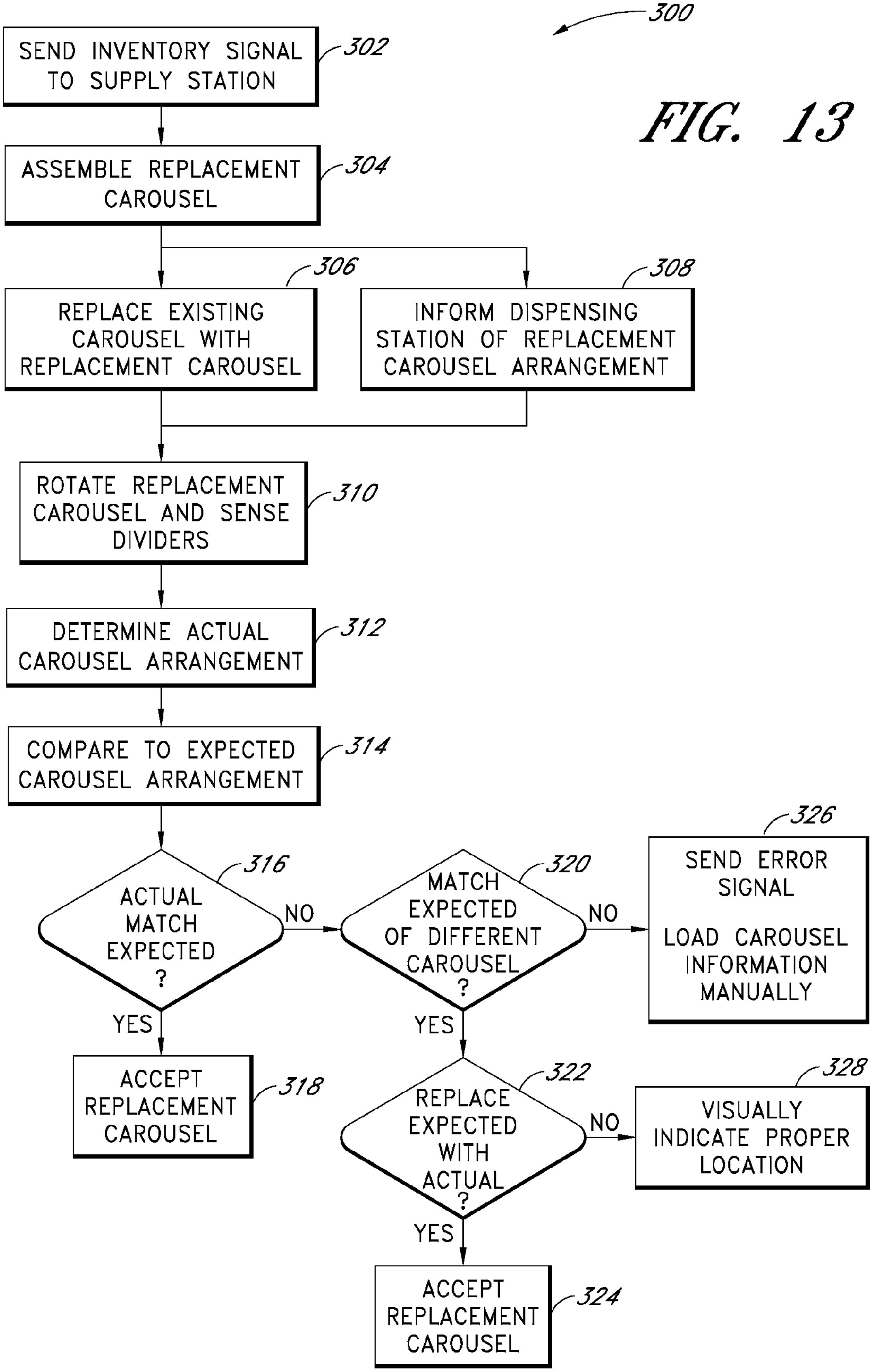
FIG. 13 is a flow diagram of a preferred method for the replacement and/or reconfiguration of a carousel assembly, such as that used in the dispensing system of FIGS. 1-11.

As described above, one advantageous feature of the illustrated system 10 involves the ability to configure, or reconfigure, the system 10 to meet the particular needs of an end user without a large amount of downtime and in a cost-effective manner. FIG. 13 illustrates a preferred method 300 for the replacement or reconfiguration of a carousel 24 within the carousel assembly 20 of a dispensing unit 14. At block 302, the method 300 includes sending an inventory signal to the supply station 12 (or other remote component of the system 10) regarding the current inventory level of the carousel 24. The decision to send the inventory signal may originate from the dispensing unit 14 or may be sent in response to a query signal from the supply station 12 (or other remote component of the system 10).

At block 304, a replacement carousel is assembled with a desired type and quantity of dispensable items. The quantity and type of items may be determined by the system 10 and may be manually assembled by a user of the system 10. Furthermore, a user of the system 10 may make alterations to the suggested quantity and items of the system for the replacement carousel and enter such alterations into the system 10. Alternatively, the replacement carousel may be assembled at the site of the dispensing unit 14.

Blocks 306 and 308 include replacing the existing carousel 24 with the replacement carousel and informing the dispensing station of an arrangement of the replacement carousel (i.e., the "expected arrangement"), respectively. The activities of blocks 306 and 308 may be performed in any order, or may be performed simultaneously. For example, in one arrangement, the supply station 12, or other component of the system 10, may send a signal to the dispensing unit 14, including information as to the arrangement of the replacement carousel (the expected arrangement), including type and quantity of items and their location within the segments 40 of the carousel 24. The existing carousel 24 may then be replaced by the replacement carousel. With this method, the dispensing unit 14 will have already received the information as to the arrangement of the replacement carousel.

In an alternative arrangement, informing the dispensing unit 14 of the replacement carousel arrangement (the expected arrangement) may occur simultaneously with the replacement of the existing carousel 24 with the replacement carousel. For example, a bar code and reader or other information transfer system, such as an RFID system, may be used to simultaneously transfer information regarding the arrangement of the replacement carousel (the expected arrangement) along with replacement of the existing carousel 24.

At block 310, the dispensing unit 14 rotates the replacement carousel and senses each individual divider 42, preferably relative to a known, or zero, position of the replacement carousel. Thus, using the information regarding the position of the dividers 42, the system 10 is capable of determining an actual arrangement of the carousel (the "actual arrangement"), preferably including the size and relative location of the segments 40 at block 312.

At block 314, the method 300 compares the expected carousel arrangement to the actual carousel arrangement. At block 316, if the actual carousel arrangement matches the expected carousel arrangement, the method 300 moves to step 318 wherein the replacement carousel is accepted by the system 10. These activities permit the system 10 to verify that the actual items in the replacement carousel are most likely the same as the items expected by the system 10. If desired, additional verification steps may be taken, such as requesting visual verification of the item(s) present in one or more segments 40 by a user of the system 10, for example.

At block 316, if the actual arrangement does not match the expected arrangement, the method moves to block 320, wherein it is determined whether the actual arrangement of the replacement carousel matches the expected arrangement of a different carousel (the "alternate carousel") within the dispensing unit 14, if the unit 14 contains multiple carousel assemblies 20. That is, if the replacement carousel was placed into the wrong carousel assembly 20.

If the actual arrangement of the replacement carousel matches the expected arrangement of a different carousel (the alternate carousel), the method moves to block 322, wherein the user is asked whether to he or she desires to replace the expected carousel arrangement within the system 10 with the actual carousel arrangement. That is, the system 10 can update the location of the replacement carousel to the appropriate carousel assembly 20, without requiring the user to physically move the replacement carousel to the location, or carousel assembly 20, that was originally expected by the system 10. Thus, the expected locations of the replacement carousels may be switched to save time and avoid unnecessary handling of the replacement carousels.

If the user indicates to the system to replace the expected carousel with the actual carousel, the method 300 moves to block 324, wherein the system accepts the replacement carousel and updates the inventory records of the dispensing unit 14. Returning to block 320, if the actual arrangement of the replacement carousel does not match the expected arrangement of a different replacement carousel, the method 300 proceeds to block 326. Preferably, at block 326 an error signal is displayed to the user and/or sent to the supply station 12. In addition, or in the alternative, the system 10 may permit the user to load the carousel information manually.

Returning to block 322, if the user determines not to replace the expected arrangement with the actual arrangement, the method moves to block 328. At block 328, system 10 preferably provides a visual indication of the proper carousel assembly 20 location for the replacement carousel. Thus, the system 10 preferably permits the user to move the replacement carousel from the improper carousel assembly 20 to the proper carousel assembly 20, if preferred. For example, if certain items are preferred in a certain location (such as an upper or lower portion) of the dispensing unit 14.

The method 300 of FIG. 13 is one of many possible methods of operation for replacing or reconfiguring the described system 10. Thus, the method 300 may be modified to suit the particular requirements or criteria of a particular embodiment of the system 10. For example, not all of the activities may be included in the method 300 and additional activities may be performed. Further, alternative activities may take the place of the one or more activities of the method 300 described above.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present control dispensing system has been described in the context of a particularly preferred embodiment, the skilled artisan will appreciate, in view of the present disclosure, that certain advantages, features, and aspects of the system may be realized in a variety of other applications, many of which have been noted above. Additionally, it has been contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A method of controlled dispensing of items from a dispensing system, comprising:

providing in a cabinet a first tray containing a first plurality of items within a first housing, said first housing including a first opening permitting access to one or more of said first plurality of items;

providing a first door closing said first opening;

providing in said cabinet a second tray containing a second plurality of items within a second housing, said housing including a second opening permitting access to one or more of said second plurality of items;

providing a second door closing said opening;

moving one of said first tray and said second tray until a segment of said one of said first tray and said second tray containing a desired one of said plurality of items is generally aligned with said opening without moving the other of said first tray and said second tray;

permitting one of said first door and said second door associated with said one of said first tray and second tray containing said desired one of said plurality of items to move in an opening direction; and limiting movement of said one of said first door and said second door to a selected distance in a first direction approximately equal to a dimension of said segment in said first direction if said selected distance is less than a maximum opening distance of said one of said first door and said second door.

2. The method of claim 1, additionally comprising maintaining a record of an item removed from said segment and updating an inventory record of said dispensing system to account for the removal of said item.

3. The method of claim 2, additionally comprising permitting said item to be replaced to said segment and updating an inventory record of said dispensing system to account for the replacement of said item.

4. The method of claim 1, additionally comprising requesting user identification from a user prior to permitting said door to open.

5. The method of claim 4, additionally comprising permitting or denying access to an item within said dispensing system based on a predetermined access right associated with a particular user.

6. A method of replenishing a dispensing system, comprising:

communicating to a supply station a need for replenishment of an existing carousel of said dispensing unit;

preparing a replacement carousel having a plurality of segments of said replacement carousel;

communicating from said supply station to said dispensing unit an expected segment pattern of said replacement carousel;

replacing said existing carousel with said replacement carousel;

rotating said replacement carousel through at least one full revolution;

sensing each of a plurality of dividers to determine a segment pattern of said replacement carousel;

comparing said segment pattern of said replacement carousel to said expected segment pattern; and accepting said replacement carousel if said segment pattern of said replacement carousel matches said expected segment pattern.

7. The method of claim 6, wherein said communicating said expected segment pattern and said replacing said existing carousel with said replacement carousel happens simultaneously.

8. The method of claim 6, additionally comprising communicating to said dispensing unit a record of items within said plurality of segments of said replacement carousel.

9. The method of claim 8, wherein said communication of said items happens simultaneously with said replacement of said existing carousel with said replacement carousel.

10. The method of claim 8, wherein said communication of said items happens prior to said replacement of said existing carousel with said replacement carousel.

11. The method of claim 8, additionally comprising requesting a user to visually verify said item within one or more of said plurality of segments.

12. A method of reconfiguring a dispensing system, comprising:

providing a dispensing machine, including a first carousel, with an expected segment pattern of a second carousel;

determining when said first carousel has been replaced with said second carousel;

determining a zero position of said second carousel with respect to a housing of said dispensing machine;

rotating said second carousel through a complete revolution and sensing a location of each of a plurality of dividers of said second carousel relative to said zero position;

determining a pattern of a plurality of segments of said second carousel defined by said plurality of dividers; and comparing said pattern of said segments of said second carousel with an expected pattern.

13. The method of claim 12, additionally comprising confirming that said second carousel is correct if said pattern of said segments of said second carousel matches said expected pattern.

14. The method of claim 13, additionally comprising prompting visual verification of an item in one or more of said segments by a user to further verify that second carousel is correct in the event that said expected pattern is identical to an additional expected pattern of an additional carousel within said dispensing machine.

15. The method of claim 14, additionally comprising updating said dispensing machine if said user decides to accept said second carousel when said visual verification reveals that said second carousel is incorrect.

16. The method of claim 12, additionally comprising notifying a user that said second carousel is incorrect if said pattern of said segments of said second carousel does not match said expected pattern.

17. The method of claim 16, additionally comprising updating said dispensing machine if said user decides to accept said second carousel that is incorrect if said pattern of said second carousel matches an additional expected pattern of an additional carousel within said dispensing machine.

18. The method of claim 12, additionally comprising prompting a user to enter an identification of an item within each segment of said carousel into said dispensing machine.

* * * * *